H. BATES.
MACHINE FOR TEACHING TYPE WRITING.
APPLICATION FILED FEB. 23, 1917. RENEWED MAR. 12, 1919.
1,319,687.
Patented Oct. 28, 1919.
4 SHEETS—SHEET 1.
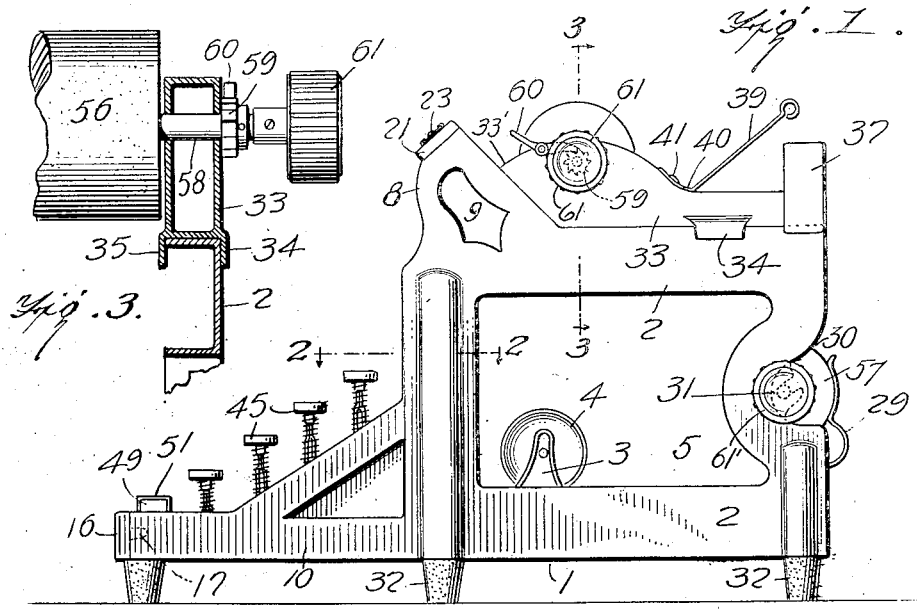
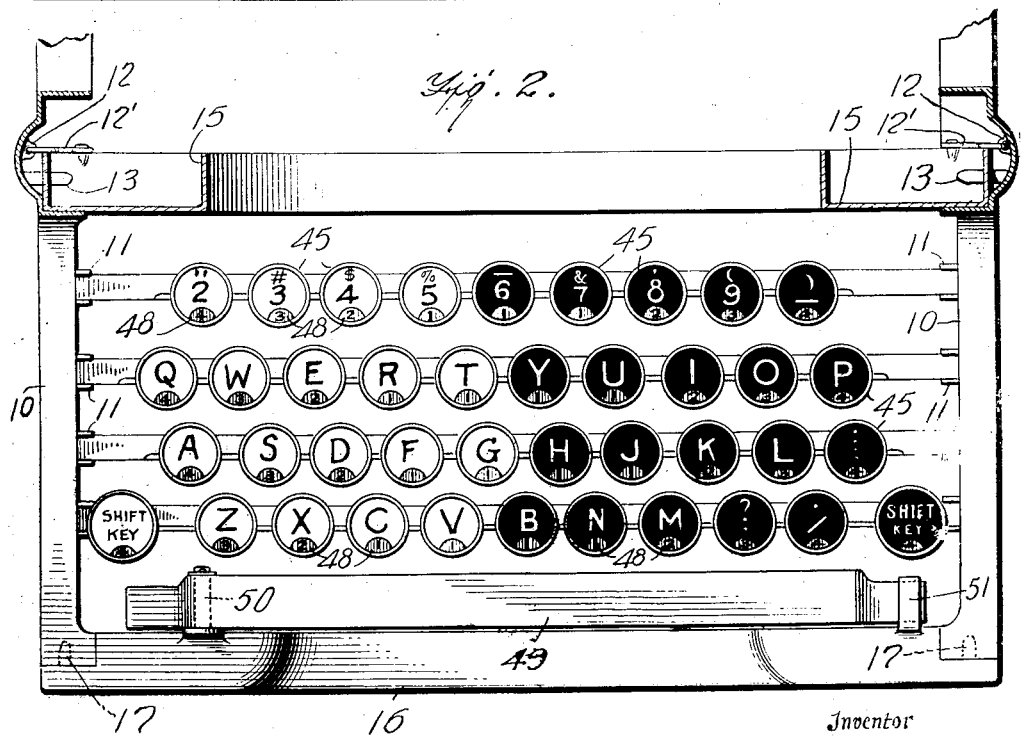
Inventor
HARRY BATES
By E. T. & J. F. Brandenburg,
Attorneys

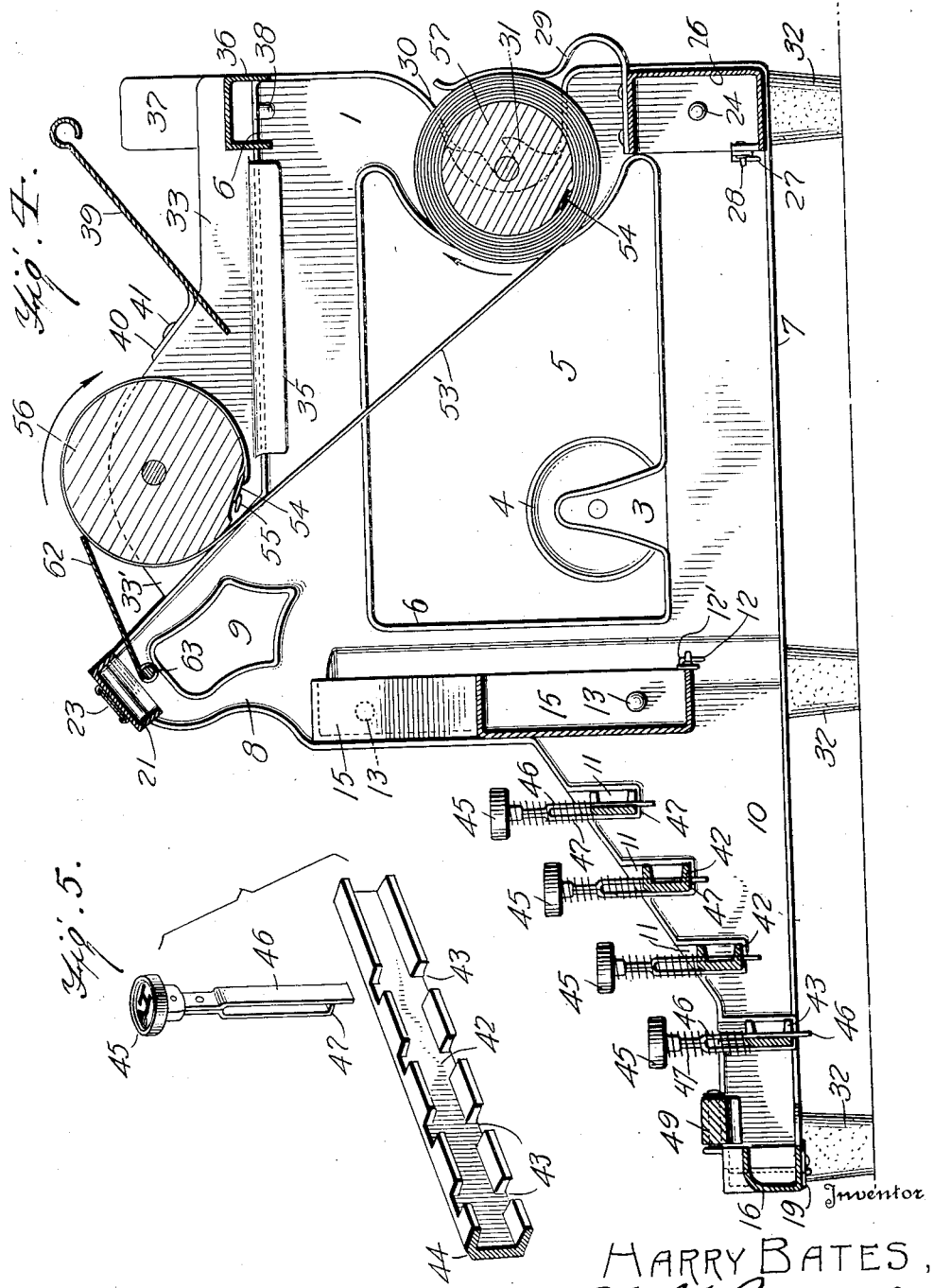

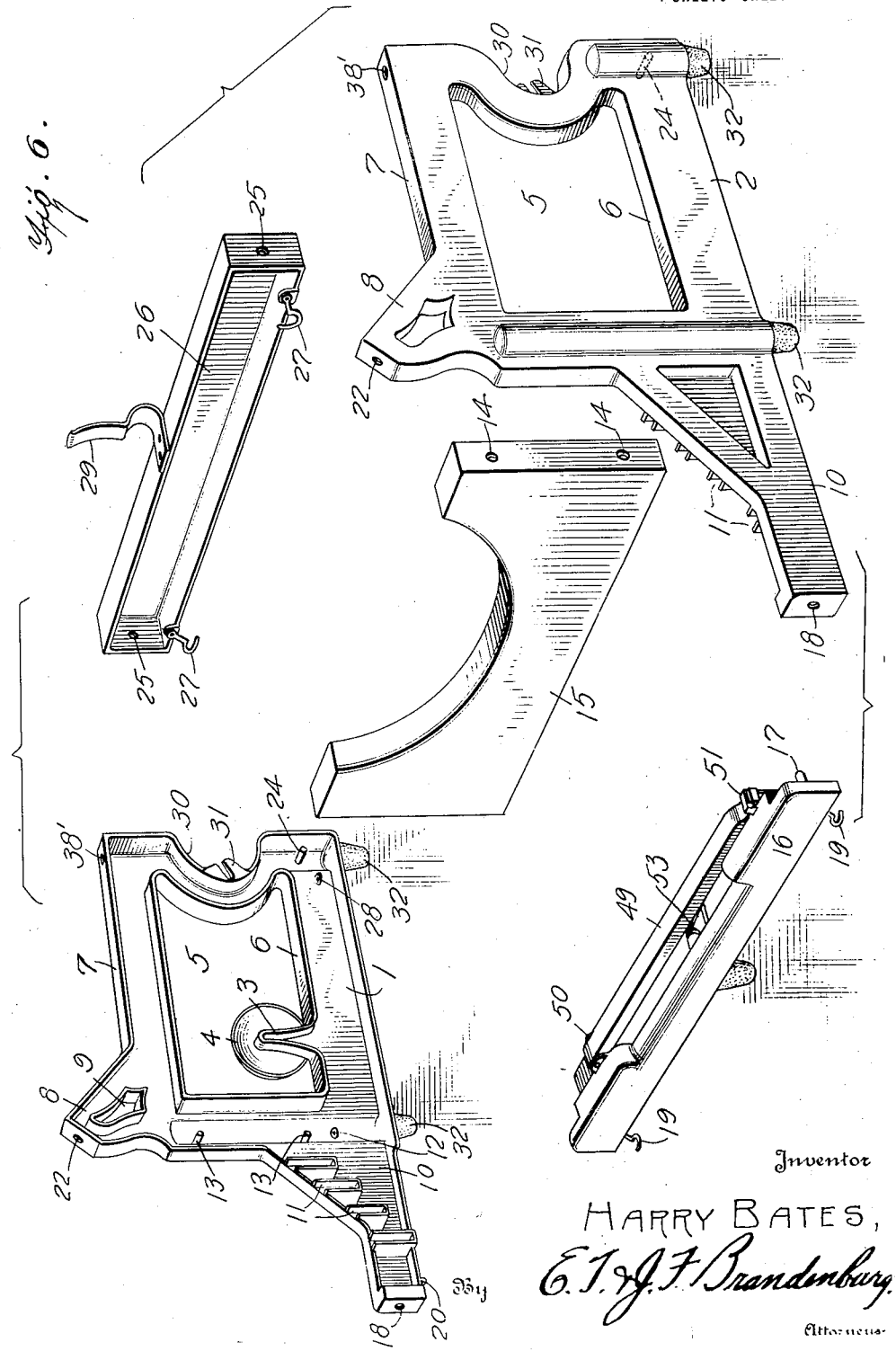

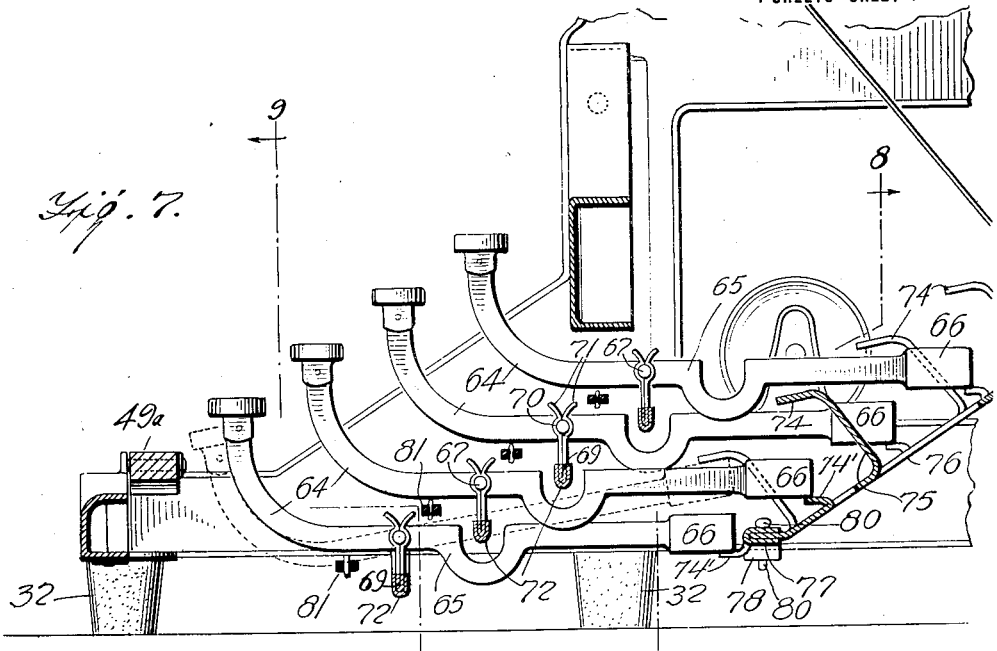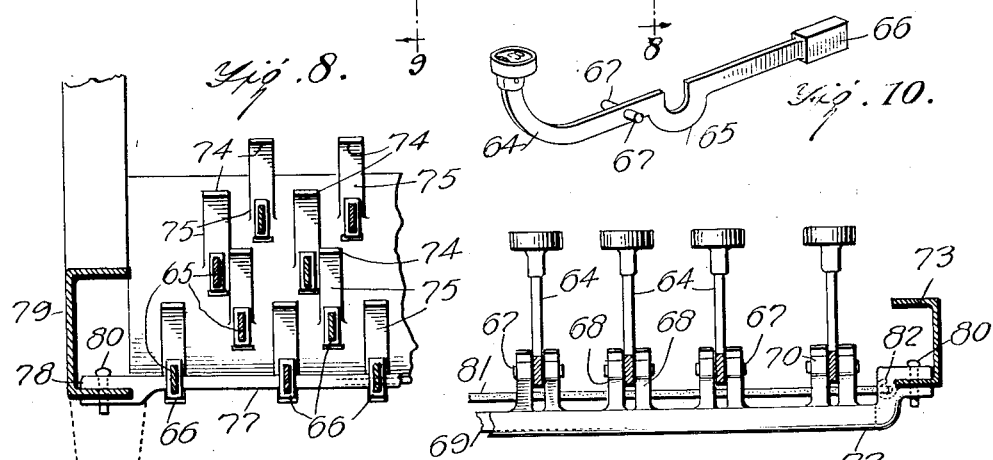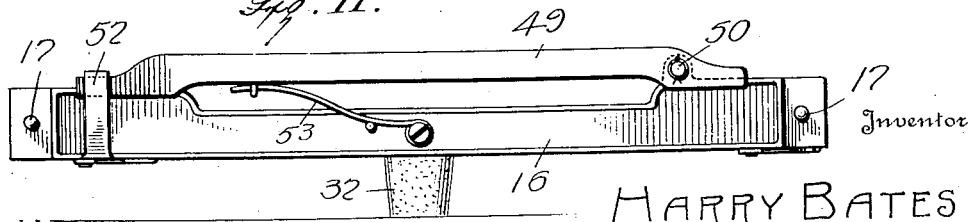

UNITED STATES PATENT OFFICE.

HARRY BATES, OF NEW YORK, N. Y.

MACHINE FOR TEACHING TYPE-WRITING.

1,319,687.      Specification of Letters Patent.      Patented Oct. 28, 1919.

Application filed February 23, 1917, Serial No. 150,520. Renewed March 12, 1919. Serial No. 282,190.

*To all whom it may concern:*

Be it known that I, HARRY BATES, a citizen of the United States, residing at No. 440 Riverside Drive, New York, in the county of New York and State of New York, have invented certain new and useful Improvements in Machines for Teaching Type-Writing, of which the following is a specification.

The principal object of my invention is to provide what I term an educational typewriter, embodying the use of educational, printed charts or lesson-strips or sheets, and means for supporting the same rotatably to bring successive lines of printing on the lesson-charts into visual position.

Otherwise stated, the basic idea, the fundamental purpose, of my invention is to provide an educational device, simulating a typewriter, by the use of which a student may not only become proficient in typewriting, *i. e.*, become familiar with the proper position of the respective typewriter-keys, and acquire dexterity in typewriter finger-exercise, but, also, at the same time, will be instructed in, say, kindergarten work, history, spelling, biography, geography, etc.

My machine dispenses with the necessity of the use, for mere practice purposes, of an expensive typewriter, and it is possible to construct my machine at such a figure that it may be acquired by a student at small cost.

In carrying out my educational idea, I employ, in connection with my educational typewriter, a roll of paper having printed thereon lessons of various kinds. Thus, the printed practice lessons on the roll may relate to history, geography, spelling, grammar, biography, etc.; and the student, closely following these lessons, word by word, by practising on the typewriter-keys, memorizes such lessons,—thereby, aside from acquiring dexterity in typewriting and in typewriter finger-exercise, acquiring knowledge of many useful subjects relating to, say, history, biography, grammar and the like, covering a broad field of mental activity.

Another important object is to provide a machine for teaching typewriting and for otherwise educationally instructing a pupil, whose touch will be, in effect, a duplication of the touch of a standard typewriting machine; *i. e.*, a touch which is extremely light and easy,—the precise sensation that is received from striking the keys of, say, the Underwood typewriter, which is known to have a very light and easy touch, being obtained by the use of my device.

Another object is to provide an educational typewriter in which, by novel instrumentalities, when a key is struck, a sound will be produced similar to that of type striking the platen on an ordinary typewriting machine.

Another object is to provide an educational typewriter constructed in a novel manner whereby it may be knocked down to occupy small space in shipping, etc.; and which will afford interest, amusement and instruction to children, in setting up or assembling the parts thereof, after the manner of the well-known structural steel "erector" toys, now on the market and sold in large quantities.

Another object of the invention is to provide a machine for teaching typewriting in which lesson strips or sheets are employed mounted upon rollers or cylinders.

Another object is to provide a machine for teaching typewriting in which the keystems or key-levers are severally removable, whereby a student may have the full complement or bank of keys in position to practice on, or may have as few thereof in position as he may desire. Thus, it is desirable, with a "green" student, to have him practice, at first, on but a few keys, say the keys of a single row, until he is thoroughly familiar therewith; and, therefore, those few keys, only, may be disposed in position, and, when he becomes thoroughly familiar therewith, another row of keys may be set up in position, and so on.

Other objects, not specifically listed hereinabove, will appear as the specification proceeds and the nature of the invention more fully develops.

With these objects in view, the invention resides in the novel construction, combination and arrangement of parts as will be hereinafter fully described in the specification, summed up in the claims, and illustrated in the drawings.

In the accompanying drawings, in which like reference-characters denote corresponding parts throughout the several views, I have disclosed a form of embodiment of my invention capable of carrying out the underlying principles thereof. The several views of the drawings may be briefly described as follows:

Figure 1 is a view in end elevation of my machine for teaching typewriting;

Fig. 2 is a horizontal section on the line 2—2, Fig. 1, looking in the direction of the arrows;

Fig. 3 is a vertical section on the line 3—3, Fig. 1, looking in the direction of the arrows;

Fig. 4 is a transverse vertical central sectional view;

Fig. 5 is a collective detail view of one of the removable key-stems, carrying a key, and of the removable support therefor;

Fig. 6 is a collective detail view of parts of the typewriter-frame;

Fig. 7 is a view in perspective of a slightly modified form in which key-levers are employed, the modification consisting, also, in different means for removably supporting the key-levers, the remainder of the structure being the same as shown in the preceding figures;

Figs. 8 and 9 are vertical sectional views, on the line 8—8 and 9—9, respectively, of Fig. 7, looking in the direction of the arrows;

Fig. 10 is a detached detail view of one of the key-levers shown in Fig. 7;

Fig. 11 is a view in rear elevation of the space-bar used in connection with the devices of the preceding figures.

Referring, now, in detail to the drawings, and, first, to Figs. 1 to 6 and 11 thereof:

*The typewriter frame.*

Advantageous results accrue from a collapsible typewriter-frame, and, it being one of the principal objects of my invention, to devise the best construction of collapsible or "knock-down" frame, the preferred form thereof has been illustrated in the drawings, and will now be described:

The frame is, desirably, constructed of sheet metal, preferably structural steel. Two vertical side-plates 1, 2, are provided, which are identical in construction, except that one preferably carries a bracket 3, carrying a bell 4, simulating the ordinary typewriter. The bell is, of course, non-essential, and may be omitted, if desired. Each side frame-plate, for the dual purpose of lightness of weight and of cheapness of construction, is, preferably, provided with a large central opening 5 and, surrounding this opening, may be a flange 6. Also, surrounding each plate is, desirably, a marginal flange 7. Each side frame-plate may carry, at its upper forward end, a forward-projecting extension 8, provided with an aperture 9. Extending forward from the front of each side frame-plate is an arm 10, carrying, on its inner face, a series of stepped sockets 11 arranged in descending or ascending order, as shown. These sockets are vertically disposed, as shown, and each is provided with an open upper end, a closed bottom end, and are also open along one longitudinal side, as shown. The function of these sockets will hereinafter appear. Each plate 1, 2 is provided, preferably, on its inner face, adjacent the front end thereof and the rear end of the arm 10, with pins 13 engageable with openings 14 carried by the frame-member 15, in the respective ends thereof. Each plate 1, 2 is also provided with eyes 12, with which hooks 12' carried by the front frame-member 15 may engage, to retain the frame-member against accidental displacement. The front frame-member 15 is disposed between and connects the two side frame-members 1, 2; the two side frame-plates 1, 2 and the front frame-member 15 being thereby readily separable.

Connecting the free ends of the arms 10, 10 of the side frame-plates 1, 2 is a bar 16, conveniently provided with pins 17, one thereof being disposed toward each end of the bar and seatable in sockets 18, 18 in the front ends of the arms 10, 10.

Suitable means are provided for preventing accidental separation of the bar 16 from the arms 10, 10, and, in this instance, swinging hooks 19, 19 are carried by the bar and may, when the parts are set up, be engaged with eyes 20 carried by the arms 10, 10.

Connecting the upper or free ends of the projections 8, 8, is a bar 21 (Figs. 1 and 4), which may be removably secured to said projections, as by means of screws, or the like, passing therethrough into threaded openings 22 (Fig. 6) in the extensions or projections 8, 8.

The bar 21 preferably carries a typewriter-scale 23, similar to that of the Underwood typewriter, for instance.

Each of the frame-plates 1, 2 is provided, toward its rear lower corner, with a pin 24 engageable with lateral openings 25, 25 in a rear connecting member 26 uniting the side frame-plates 1, 2 at the rear thereof. The rear frame-member 26 is conveniently provided with hooks 27, 27, which may be swung into engagement with eyes 28 in the side frame-plates 1, 2, when the parts are being assembled, preventing accidental separation of said side-plates from the rear connecting member 26. The rear connecting member 26 carries a leaf-spring 29, for a purpose hereinafter appearing.

Each of the frame plates 1, 2 is provided, at its rear marginal edge, with a curved inward-extending recess 30, in which is a slotted ear 31, for a purpose presently appearing.

Each of the frame-plates 1, 2, may, also, be provided, at its lower edge, with rubber feet 32.

Connecting the side frame-plates 1, 2, at their tops, is a bridge-structure, comprising two vertically-disposed side-plates 33, 33 (Figs. 1, 3 and 4), each having two bottom depending flanges or lips 34, 35 embracing the side faces of the frame-plates 1, 2. The forward ends 33' of the side-plates 33, 33 seat against the inclined rear edge of the extensions 8, 8, as shown. Said bridge-structure also comprises a cross-bar 36 suitably united to and connecting the side-plates 33, 33. If desired, the cross-bar may be provided with upward-curved extremities 37, to present a graceful appearance. The bridge-structure, thus described, is, preferably, provided, on its under surface, with depending pins 38, which project through openings 38' provided therefor in the flange 7 of the side frame-plate 1.

Carried by the side-plates 33, 33 of the top bridge-structure may be an inclined paper-shelf 39; and any suitable means may be provided for securing the paper shelf to the said side-plates,—in this instance, the paper shelf is provided with lateral, bent tongues 40 secured to the top of the said plates 33, 33, as at 41.

*The typewriter key mechanism.*

Removably disposed in the sockets 11 are typewriter key-supporting members 42, preferably of channel-bar shape, as shown. The two flanges of each supporting bar 42 are correspondingly slotted, at intervals, as shown at 43. The supporting members 42 are disposed, as shown, so that their flanges occupy a horizontal plane, and the top, front edge of the supporting-member so disposed is beveled, as shown at 44. Each key 45 is carried at the end of a key-stem or key-bar 46, comprising two legs of differing lengths, as shown, offset from each other for the greater portion of their length, and the shorter leg being provided, at its bottom, with a bent terminal 47, normally bearing against the other leg. The legs of the stem 46 are of spring material; whereby, in assembling the keys with the supports 42, when a key-stem 46 is forced down in the slots 43, the legs of the key-stem will bear against opposite faces of the support 42, and the terminal 47 will spring under the bottom flange of the support 42, thereby holding the key against removal by an upward force applied thereto. But, when it is desired intentionally to remove the key, the key-stem is rocked sidewise, so that the terminal 47 will ride away from the bottom flange of the support 42, whereupon the key-stem may be pulled free of said support. Between the keys 45 and the supports 42, and encircling the stems 46, helical springs 47 are interposed, serving to return the key-stems to normal position after depression thereof by the operator. It will thus be noted that, in the case of a typewriting student, who has had no typewriting experience, one of the supports 42, only, may be disposed in position and a few of the key-stems 46 set up in position thereon, and the student can practice on these until he is thoroughly familiar with the positions of these keys; then a few more key-stems may be set up, and so on, until all the supports 42 are in position. The student may thus learn the positions of a few keys at a time, and not be confused by being confronted by the entire bank of keys. This feature of removability of the keys and of the supports 42 is, therefore, deemed of importance and of great advantage in my construction.

For the purpose of indicating to the student which keys are to be used with each hand, and the particular keys which are to be used with particular fingers, one set of keys 45 (for instance, those keys to be used with the right hand) may have the major portion of their top surfaces colored black, while the keys to be used with the left hand have the major portion of their upper faces uncolored, *i. e.*, white. Printed indicia may be used to indicate the particular finger to be used with a particular key, such as the numbers (indicated by the reference numeral 48) on a colored background,—*i. e.*, a portion of the upper face of each key 45 on which appears the printed indicia identified by the reference numeral 48 is colored, say, red. This printed indicia consists, preferably, of the numbers 1 to 4, inclusive, referring, respectively, to the first, second, third, and fourth fingers of the hand to be used with the keys. This means of visually indicating to the operator certain information is deemed to be particularly advantageous, as it facilitates instruction of the pupil in the correct use of the hands and fingers in typewriting.

While my keyboard has been described as embodied in, or used in connection with, a typewriter, it will be understood that it is susceptible of use with any other kind of machine employing a keyboard, such as adding machines, linotype machines, punching machines, etc.

*The typewriter space-bar.*

The typewriter-space-bar 49 is, preferably, carried by the frame-bar 16, and is pivotally connected thereto, as at 50. Upward movement of the space-bar is limited by the angled end 51 of an upright 52 carried by the frame-bar 16, said angled end being arranged in the path of movement of the free end of said space bar 49. A leaf-spring 53, one end of which is secured to the frame-bar 16 and the other end bearing against the under surface of the space-bar 49, serves to return the latter to normal position after depression thereof by the operator.

The lesson-sheet supporting mechanism.

My invention contemplates the use of suitably-inscribed lesson-sheets, for the use of the student in practising on the typewriter-keys. To this end, there may be used in connection with the machine a sheet or sheets or strips of flexible material, such as paper, or of textile material, each of said strips bearing transversely printed thereon, throughout its length, any desired matter, such as sentences relating to educational subjects. Each strip 53' is provided, laterally, with eyes 54, which are engageable with hooks 55 carried by upper and lower rollers 56, 57. The trunnions 58 of the roller 56 are rotatably mounted in the frame-bars 33, 33, and one of the trunnions 58 is extended beyond the outer surface of the frame-plate 33 (Fig. 3), and is provided with a ratchet 59 engaged by a pawl 60 carried by the frame-plate 33, so that movement of the upper roller 56 in one direction will normally be prevented. The exterior ends of the trunnions 58 may conveniently be provided with hand-twirlers 61. The lower roller 57 is provided with twirlers 61' and is supported by having its trunnions supported in the inclined slots of the ears 31, 31. The roll of paper 53' on the feeding-roller 57 is tensioned by the leaf-spring 29.

A line-indicator 62, which may be of the same length as the roller 56, has one longitudinal edge thereof bearing against the roller 56, and is pivotally secured, along its other longitudinal edge, to a rod 63, removably supported in the extensions 8, 8 of the side-frame-plates 1, 2.

Referring, now, to the construction shown in Figs. 7 to 10: This construction differs from the construction shown in the preceding figures in disclosing a somewhat different form of key-stem or key-bar and of the supporting means therefor. In every other respect, as concerns the frame, the printed indicia on and the coloring of the keys, the rollers and their supports, etc., the construction is the same as that previously discussed.

The parts wherein the construction shown in Figs. 7 to 10 differs from that shown in the preceding figures will now be pointed out:

The key-stem or key-bar 64 is here shown as having a horizontal extension 65, weighted at its free end, as shown at 66, and provided with trunnions 67, 67 rotatably seated in sockets provided therefor in spring clips 68. These spring clips may be formed integral with a metallic strip 69 bent upon itself, as shown, so as to have a U-shaped cross-section, and the clips 68 being likewise bent upon themselves, as shown, and being offset toward their upper ends on the arc of a circle, as shown at 70, so as to form the circular sockets referred to for the trunnions 67 of the key-bars. The upper or free terminals of the spring clips are bent away from each other, as shown at 71, so as to form a V-shaped opening to facilitate assemblage of the key-bars. It will be noticed, therefore, that each of the key-bars is easily removable and replaceable. The strip 69 with the clips 68 may be formed out of a single piece of sheet metal by stamping, and then bent up into proper form. Each strip 69 is removably positioned in a cradle-support 72 removably secured at its ends to the frame of the machine, as to a channel-bar 73. Arranged in the path of movement of the weighted ends of the key-bars are stops 74, which, in this instance, are the free extremities of arms 75 bent up from a base 76, which may, as shown, be a metallic plate supported in an inclined position in any suitable manner, as by having its lower edge removably clamped in a supporting member 77, whose ends 78 are secured, as at 80, to a frame-member, such as the channel-bar 79. Downward movement of the weighted ends 66 of the key-bars is limited by stops 74', the upper faces of which (or those faces with which the weighted ends 66 contact) being preferably cushioned (as by a facing of rubber) so that the weighted ends will make a noiseless contact with the stops 74'. The stops 74' are preferably formed by being bent up from the metallic base 76, as shown.

In front of the fulcrum point of each key-bar or key-lever and disposed transversely beneath the latter is an elastic band or strip 81, one of said elastic bands being used for each row of key-levers, as shown. The ends of these elastics are removably engaged by hooks 82 (Fig. 9) carried by the channel bars 73.

In use, upon depression of a key-bar or key-lever 64, the weighted end 66 thereof will strike against the metallic stop 74, thus making a sound as of type striking a typewriter platen.

After depression of a key-lever, the weight 66 and the elastic bands 81 throw the lever quickly back to normal position.

A space-bar 49ᵃ is provided, and is identical in construction with the space-bar 49, previously described.

Having thus fully described my invention, the many advantages thereof will be obvious, especially to those skilled in the art to which it appertains. I am, of course, aware that modifications, especially in detail, may be made in the physical embodiment disclosed, which, for the purposes of the patent-statutes I have described with great particularity; but all such modifica- tions as come within the terms of the appended claims fall within the purview of the invention.

Having thus fully described my invention, what I claim as new and desire to secure by Letters-Patent of the United States is:

1. In a knockdown machine for teaching typewriting, a frame including side-plates and a removable bridge-structure disposed on top of said plates; a roller rotatably mounted in said bridge-structure; a feeding-roller rotatably and removably mounted in said plates; and a lesson-strip detachably connected with each of said rollers.

2. In a knockdown machine for teaching typewriting, a frame including side-plates and a removable bridge-structure disposed on top of said plates; a roller rotatably mounted in said bridge-structure; a feeding roller rotatably and removably mounted in said plates; a lesson-strip detachably connected with each of said rollers; and a pivoted line-indicator bearing against said first-mentioned roller.

3. In a knockdown machine for teaching typewriting, a frame including side plates, a removable bridge-structure disposed on top of said plates, and a rear connecting-member removably secured to said plates and carrying a leaf-spring; a roller rotatably mounted in said bridge-structure; a feeding-roller rotatably and removably mounted in said plates, said spring bearing against said feeding-roller; and a lesson-strip detachably connected with each of said rollers.

4. In a knockdown machine for teaching typewriting, a frame comprising side plates, a front connecting member detachably connecting said plates toward the front thereof, a removable bridge-structure disposed on top of said plates, and a rear connecting member removably secured to said plates at their rear and carrying a leaf-spring; a roller rotatably mounted in said bridge-structure; a feeding-roller rotatably and removably mounted in said plates, said spring bearing against said feeding-roller; and a lesson-strip detachably connected with each of said rollers.

5. In a machine for teaching typewriting, a bank of individually-operable and removable key-bars, and removable key-bar supports, said key-bars and key-bar supports being detachably inter-related, and said key-bars being separately removable from said supports without removal or disturbance of the latter.

6. In a machine for teaching typewriting, a bank of individually-operable and removable key-bars and of removable key-bar supports, said key-bars being separately removable from said supports without removal or disturbance of the latter, the key-bars and their supports being held together against accidental disconnection by spring tension.

7. In a machine for teaching typewriting, a bank of individually operable and removable key-bars having weighted rear extremities, removable key-bar supports, said key-bars being individually removable from said supports without removal or disturbance of the latter, and metallic stops arranged in the path of movement of said weighted extremities and struck thereby in the movement thereof.

8. In a machine for teaching typewriting, etc., a bank of individually-operable and individually removable key-bars, removable key-bar supports, said key-bars being removable without removal of any of said supports, and resilient means arranged in the path of movement of said key-bars for returning the bars to normal position after actuation thereof.

9. In a machine for teaching typewriting, a bank of individually-operable key-bars having weighted rear extremities, and a plate carrying metallic stops arranged in the path of movement of said weighted extremities.

10. In a machine for teaching typewriting, a bank of individually-operable key-bars having weighted rear extremities, and a plate carrying integral metallic tongues struck up therefrom and forming stops arranged in the path of movement of said weighted extremities.

11. In a machine for teaching typewriting, a bank of individually-operable key-bars having weighted rear extremities, and a plate carrying metallic stops arranged in the path of movement of said weighted extremities, and carrying, also, stops to limit movement of said key-bars in the reverse direction.

12. In a machine for teaching typewriting, a bank of individually-operable key-bars having weighted rear extremities, and a plate carrying integral metallic tongues struck up therefrom and forming stops to limit movement of said key-bars in both directions.

13. In a machine for teaching typewriting, a bank of individually-operable and individually removable key-bars having weighted rear extremities, removable key-bar supports, said key-bars being removable without removal of any of said supports, and elastic means arranged in the path of movement of said key-bars for assisting the weights in returning the bars to normal position after actuation thereof.

14. In an educational machine, a bank of individually-operable key-bars, and spring-clips pivotally supporting said key-bars and comprising complemental vertical members arranged in pairs, the members of each pair having complemental sockets constituting bearings for the key-bar pivots.

15. In a machine for teaching typewriting, spelling, history, biography, grammar, etc., a platen-roller; a feeding-roller; a roll of flexible material, in sheet-form, mounted on said feeding-roller, one end of said sheet being connected with said platen-roller, said sheet having printed thereon lessons in educational subjects; and a bank of individually-depressible typewriter-keys.

16. In an educational machine, a bank of individually-operable key-bars, and spring-clips pivotally supporting said key-bars and comprising pairs of vertical posts, the members of each pair having complemental sockets constituting bearings for the key-bar pivots and having upper terminals bent away from each other.

17. In an educational machine, a bank of individually-operable key-bars; spring-clips pivotally supporting said key-bars; and a plurality of metallic strips, each of said strips carrying one row of said clips.

18. In an educational machine, a bank of individually-operable key-bars; spring-clips pivotally supporting said key-bars; and a plurality of metallic strips, each thereof carrying one row of said clips, the clips constituting one row and its corresponding strip being formed out of a single piece of sheet metal.

In testimony whereof, I affix my signature.

HARRY BATES.